MALTBY & BROWN.
Lid Lifter.
No. 58,442.
Patented Oct. 2, 1866.
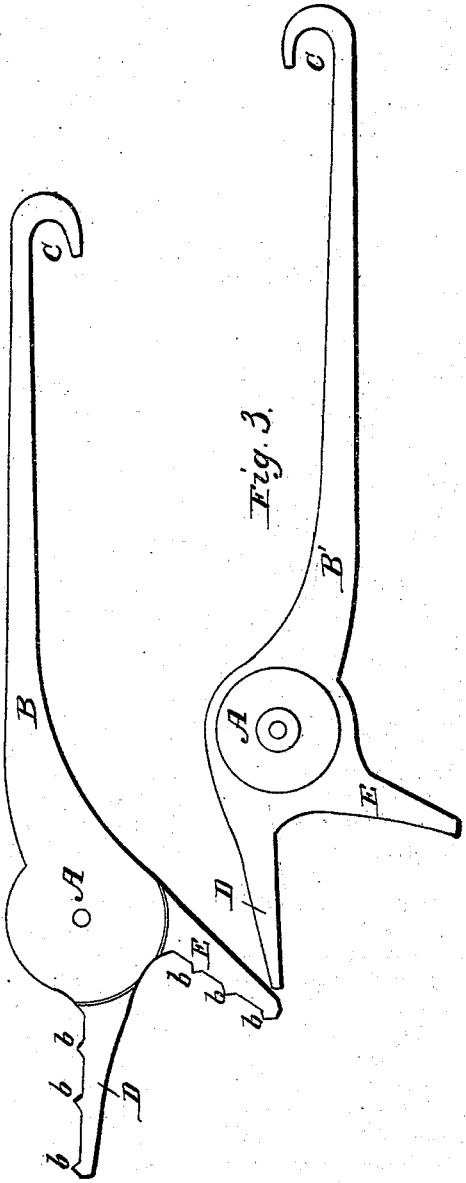

UNITED STATES PATENT OFFICE.

SIDNEY MALTBY AND J. R. BROWN, OF DAYTON, OHIO.

LIFTER FOR STOVE-COVERS, &c.

Specification forming part of Letters Patent No. 58,442, dated October 2, 1866.

*To all whom it may concern:*

Be it known that we, SIDNEY MALTBY and J. R. BROWN, of the city of Dayton, in the county of Montgomery, in the State of Ohio, have invented a new and Improved Stove-Tongs; and we do hereby declare that the following is a full and exact description thereof, reference being had to the accompanying drawings and to letters of reference marked thereon.

The nature of our invention consists in constructing a pair of stove-tongs out of cast or malleable iron, or any other suitable material, so as to permit of the attachment of one or more sets of jaws to the same set of reins, and each opposite jaw having ribs for the purpose of securing a more firm grasp upon all articles of tin or sheet-iron ware having wired edges; and in connection with the reins and jaws we provide the end of each rein with a hook to be used for all ordinary purposes where hooks are required.

To enable others skilled in the art to make and use our invention, we will proceed to describe its construction and operation.

In the accompanying drawings, Figure 1 represents a side view of the stove-tongs with the jaws open, showing the ribs on the under jaw; also, the hooks on the end of reins.

Letter A, Fig. 1, represents the rivet or joint upon which the jaws and reins work. *b b b* represent the ribs on the jaws. C C represent the hooks on the ends of reins. D D represent one set of jaws to be used for the purpose of lifting off stove-lids, opening stove-doors, handling grates and pie-plates, and for other general purposes. E E represent one set of jaws to be used for the purposes of lifting all kinds of pans and cooking utensils with wire edges, the under jaw being constructed with ribs, to prevent slipping, and set at an angle, so as to form a convenient handle when applied to a pan or any other cooking utensil.

Figs. 2 and 3 represent an open sectional view of the stove-tongs, like letters and like figures referring to like parts, B representing one part of the device as shown in Fig. 1, and B' the other. The ribs *b, b,* and *b* are cast or formed on B.

Having thus described our invention, what we claim as new, and desire to secure by Letters Patent, is—

1. A stove-lifter composed of the parts B B' and jaws D D and E E, constructed and arranged as and for the purpose shown.
2. Providing one jaw in each set with ribs.
3. The hooks on ends of reins, in combination with the reins and jaws, all substantially as and for the purposes set forth.

SIDNEY MALTBY.
J. R. BROWN.

Witnesses:
JOSIAH LOVELL,
THOS. D. MITCHELL.